Feb. 13, 1951   A. H. GOREY   2,541,413
PHOTOGRAPHIC CAMERA AND SHUTTER THEREFOR
Filed April 1, 1947   8 Sheets-Sheet 3
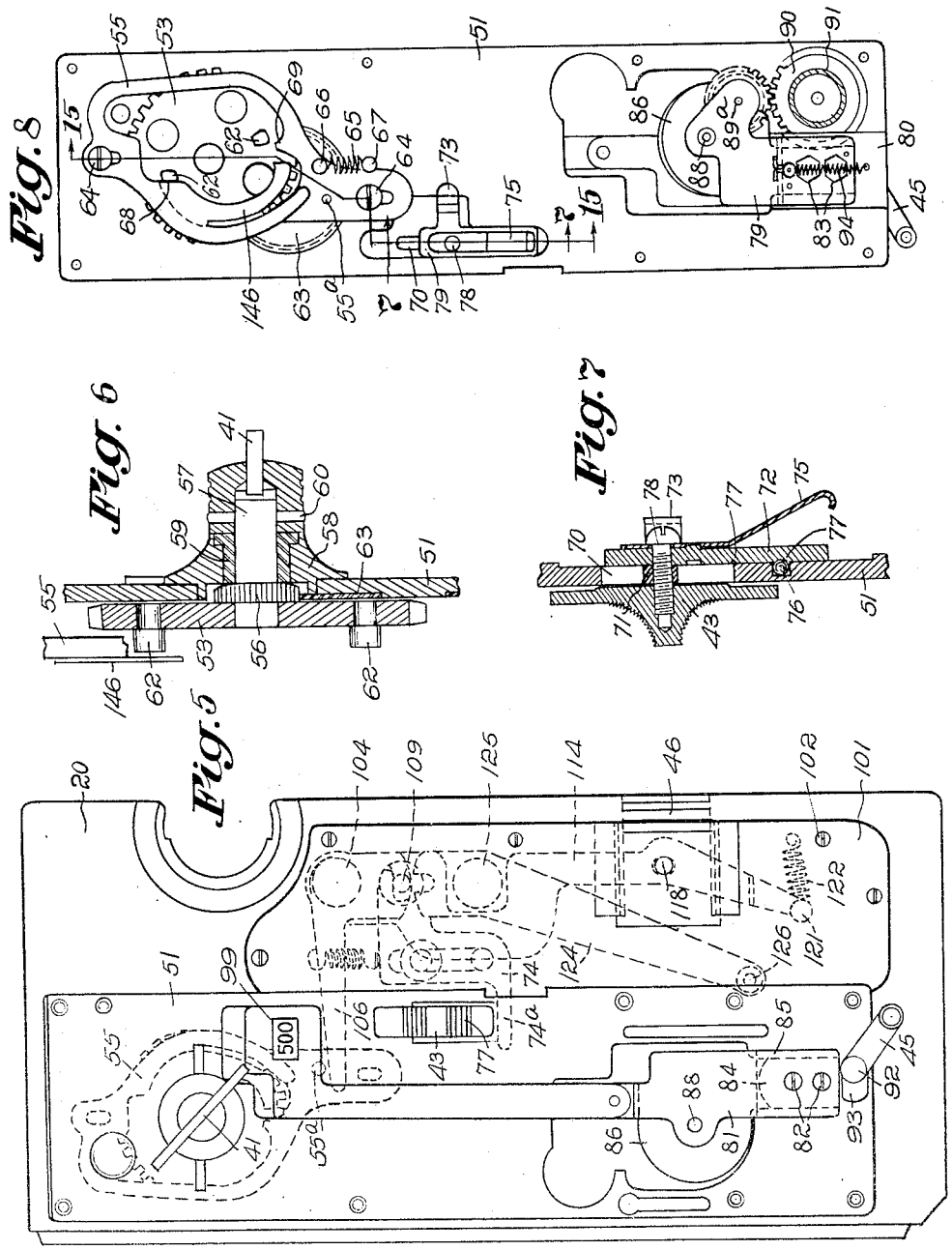
INVENTOR.
Archie H. Gorey
BY
Emery, Booth, Townsend, Miller and Linden
Attys Feb. 13, 1951 A. H. GOREY 2,541,413
PHOTOGRAPHIC CAMERA AND SHUTTER THEREFOR
Filed April 1, 1947 8 Sheets-Sheet 4
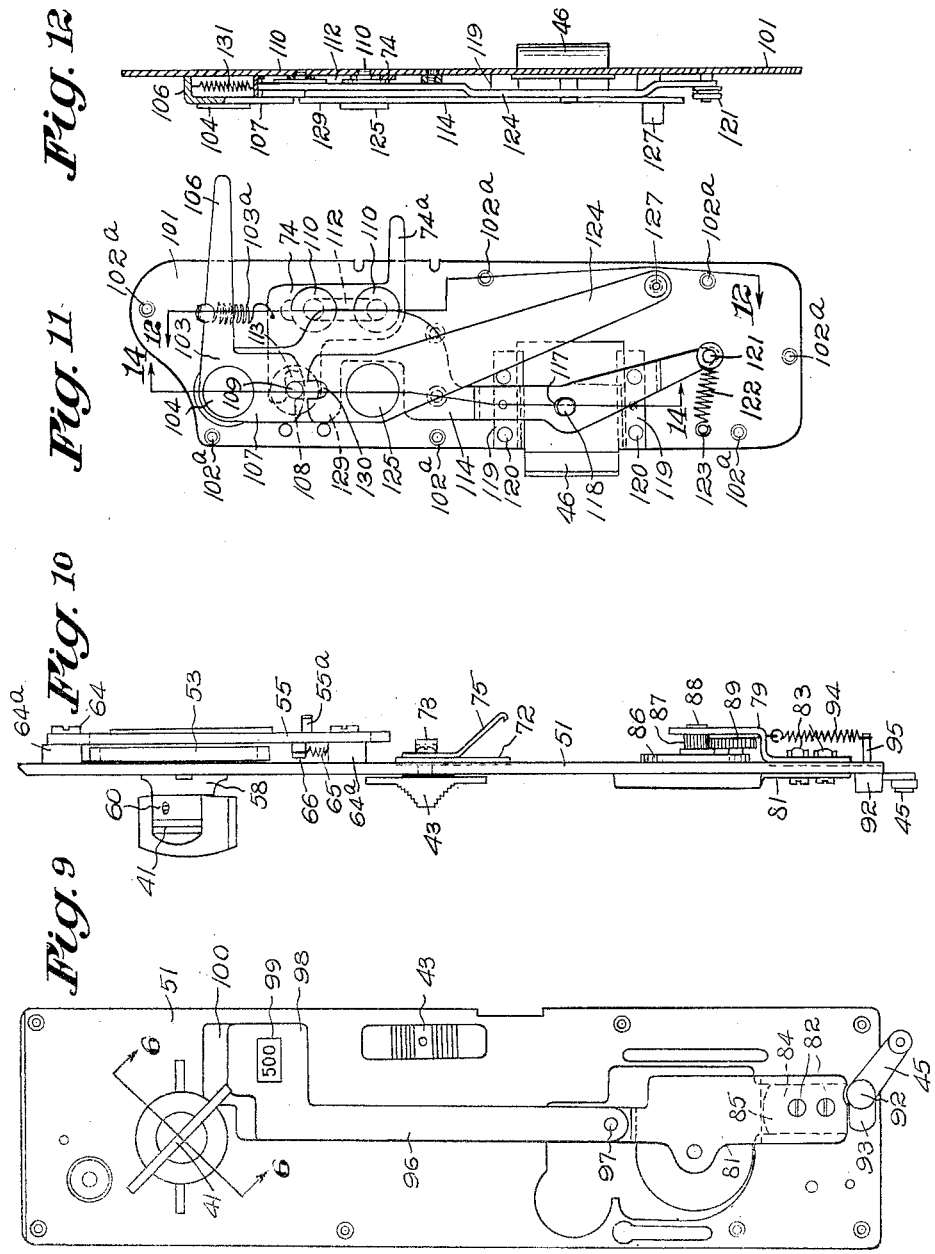
INVENTOR.
Archie H. Gorey.

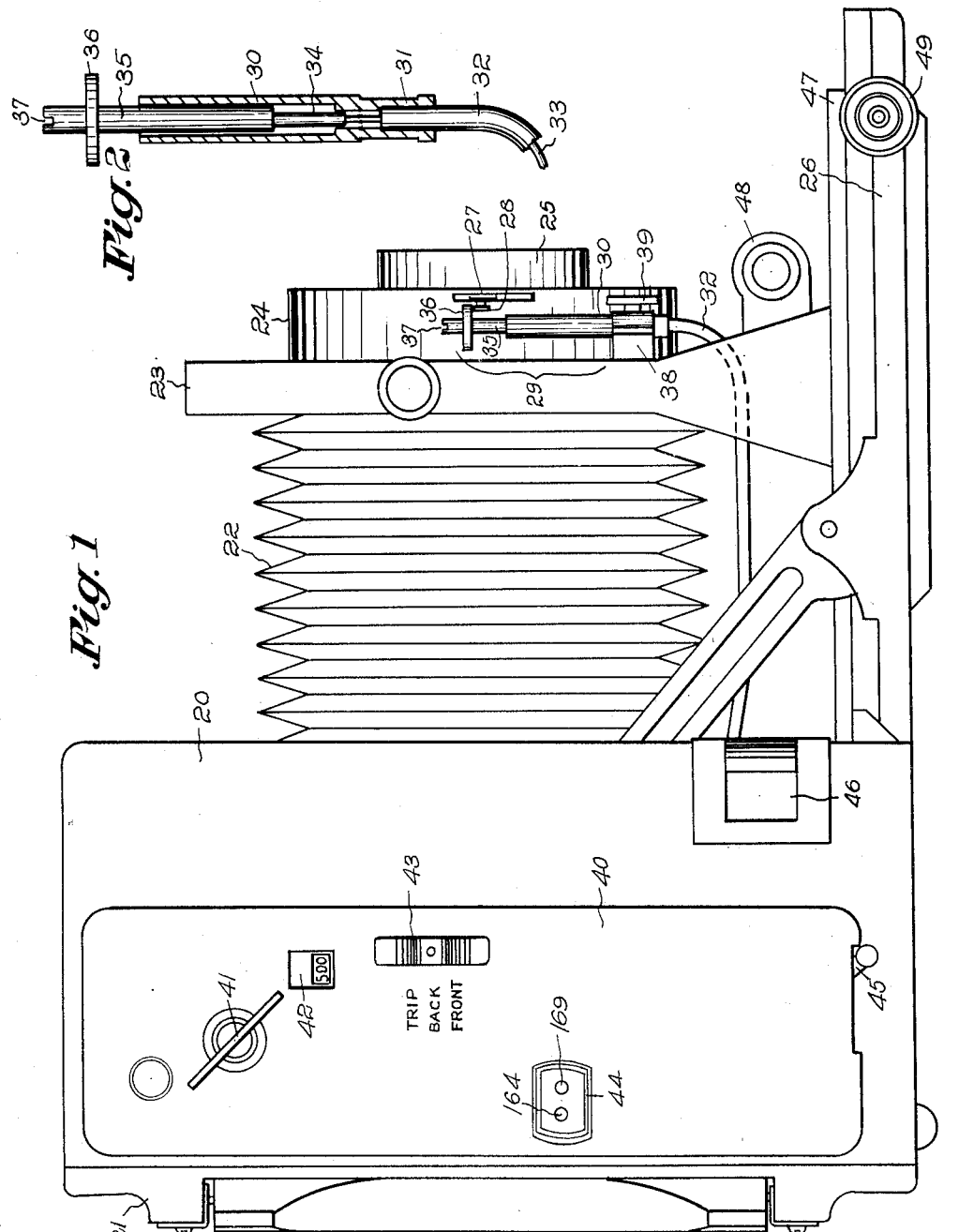

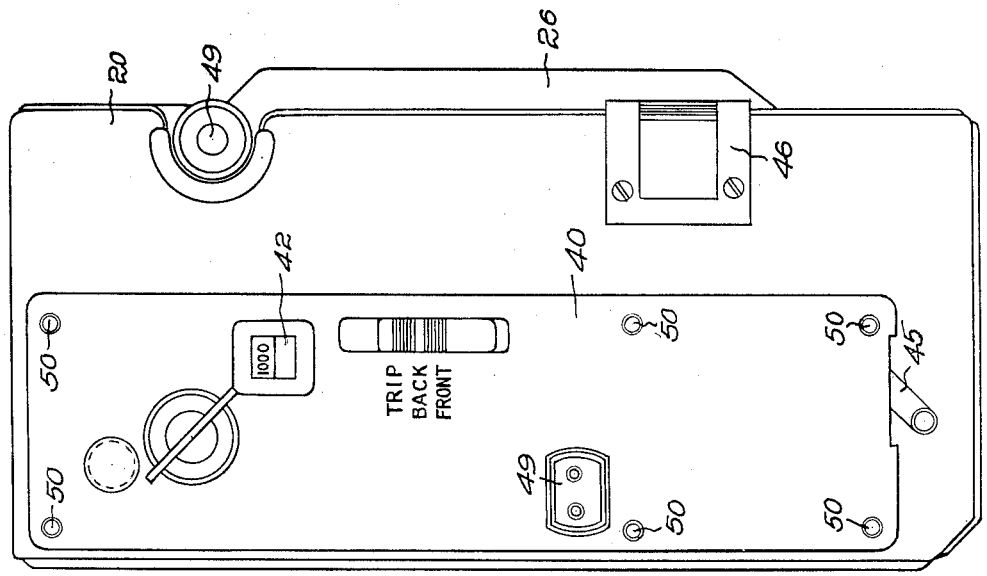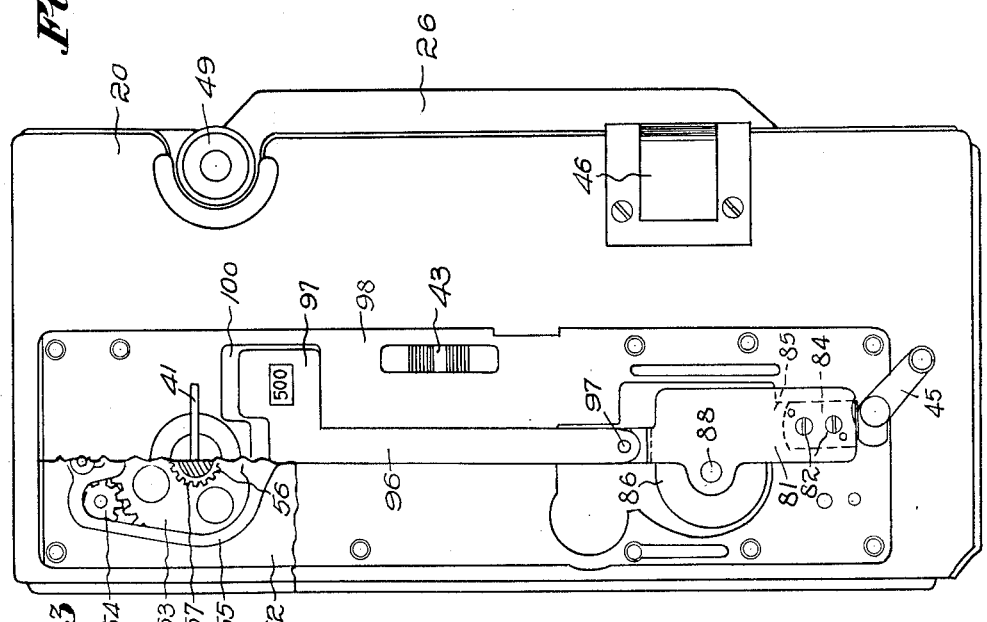

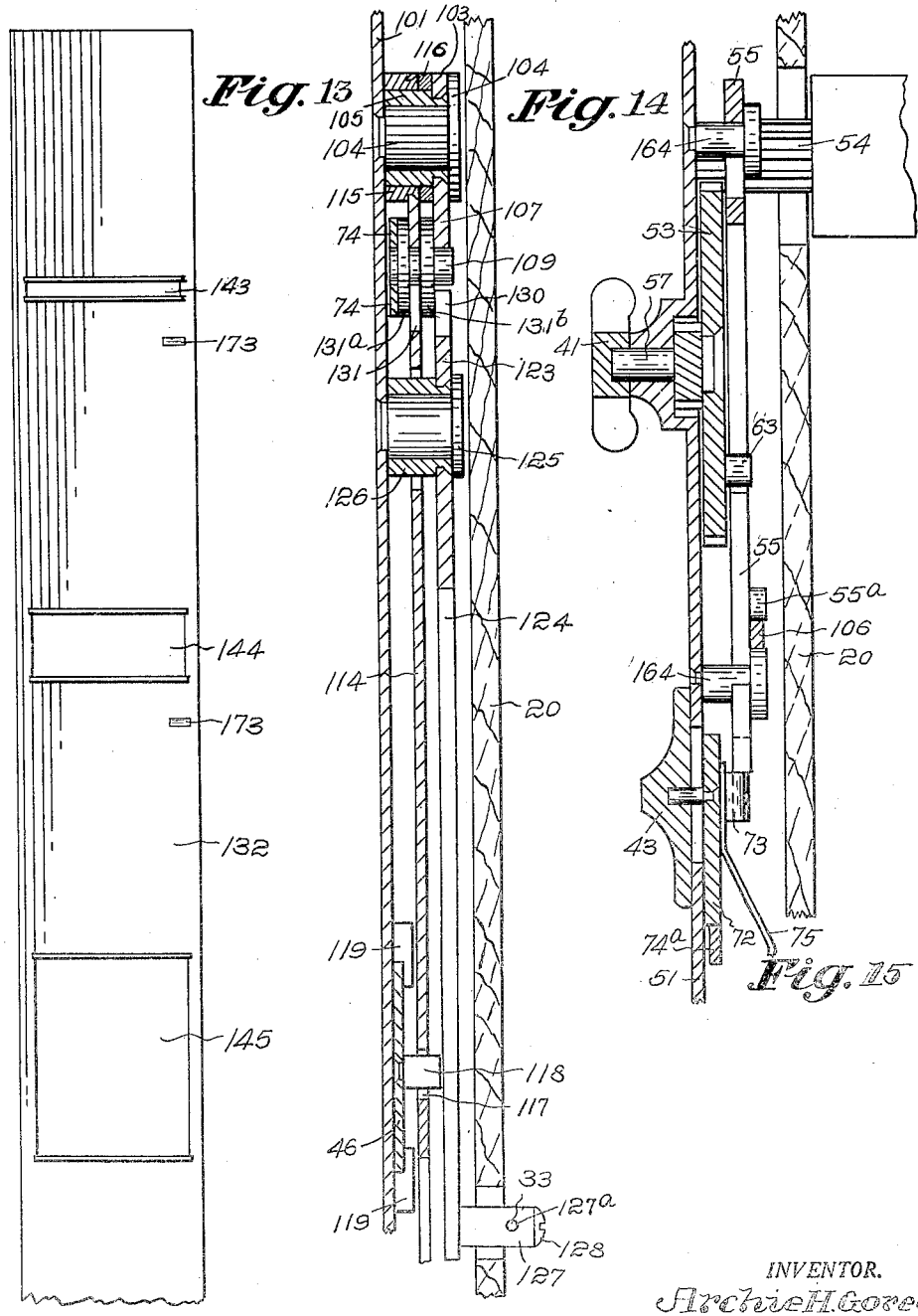

Feb. 13, 1951 A. H GOREY 2,541,413
PHOTOGRAPHIC CAMERA AND SHUTTER THEREFOR
Filed April 1, 1947 8 Sheets-Sheet 6
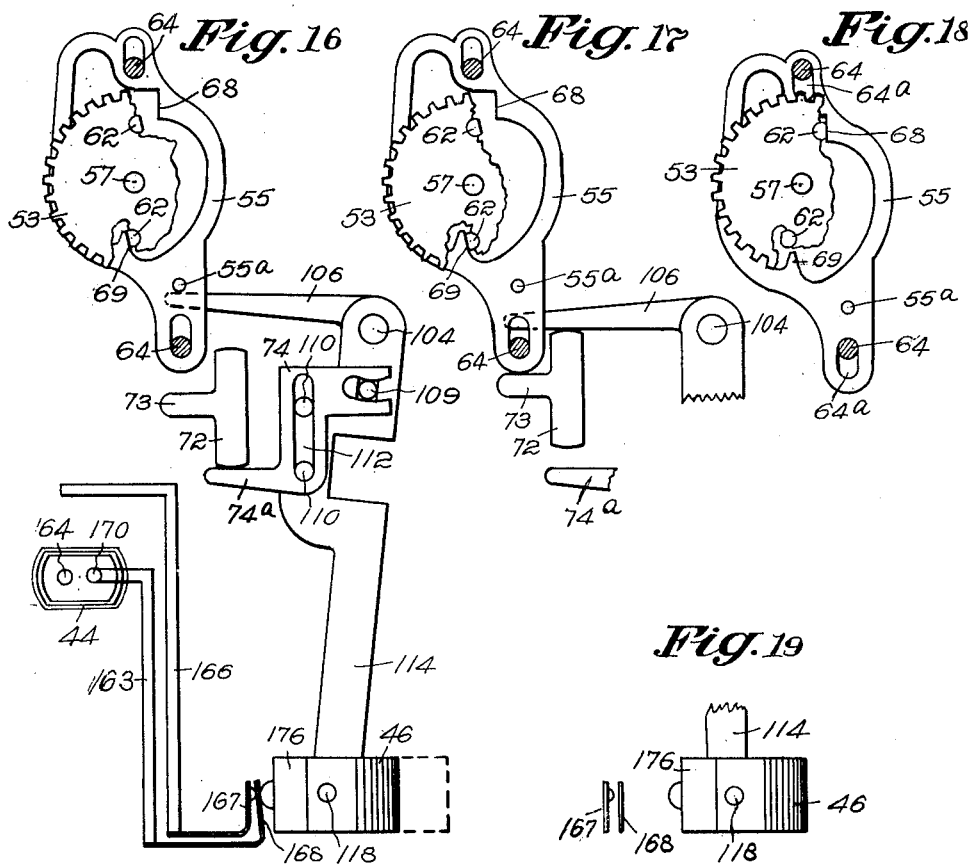
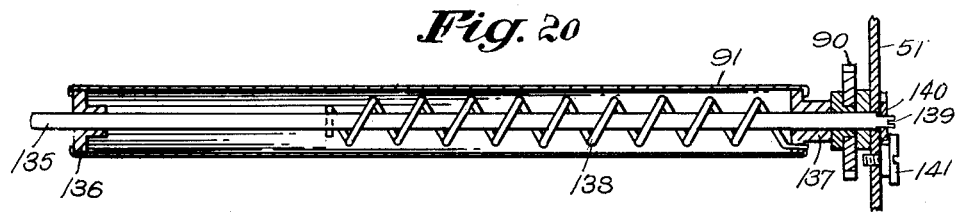
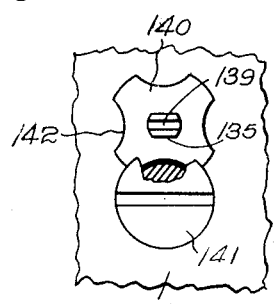
INVENTOR.
Archie H. Gorey
BY
Attys Feb. 13, 1951        A. H. GOREY        2,541,413
PHOTOGRAPHIC CAMERA AND SHUTTER THEREFOR
Filed April 1, 1947        8 Sheets-Sheet 7
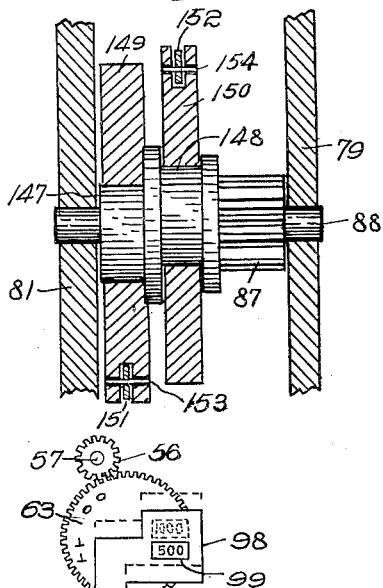
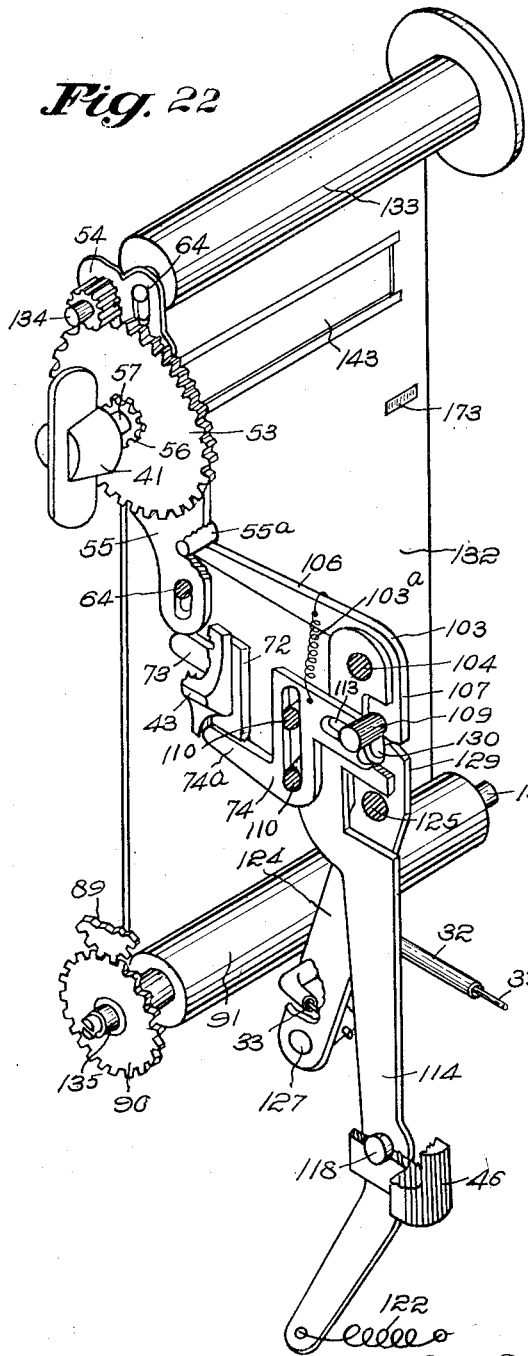
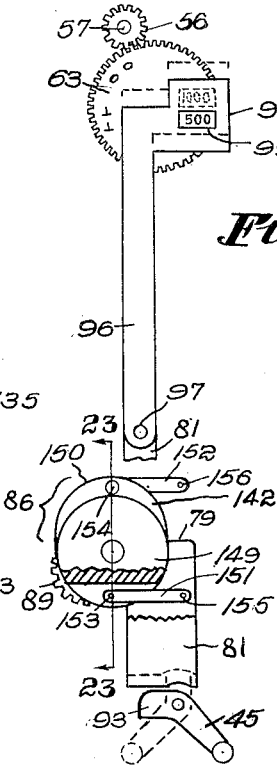
INVENTOR.
*Archie H Gorey.*
BY
*Emery, Booth, Townsend, Miller and Meiden.*
Attys.

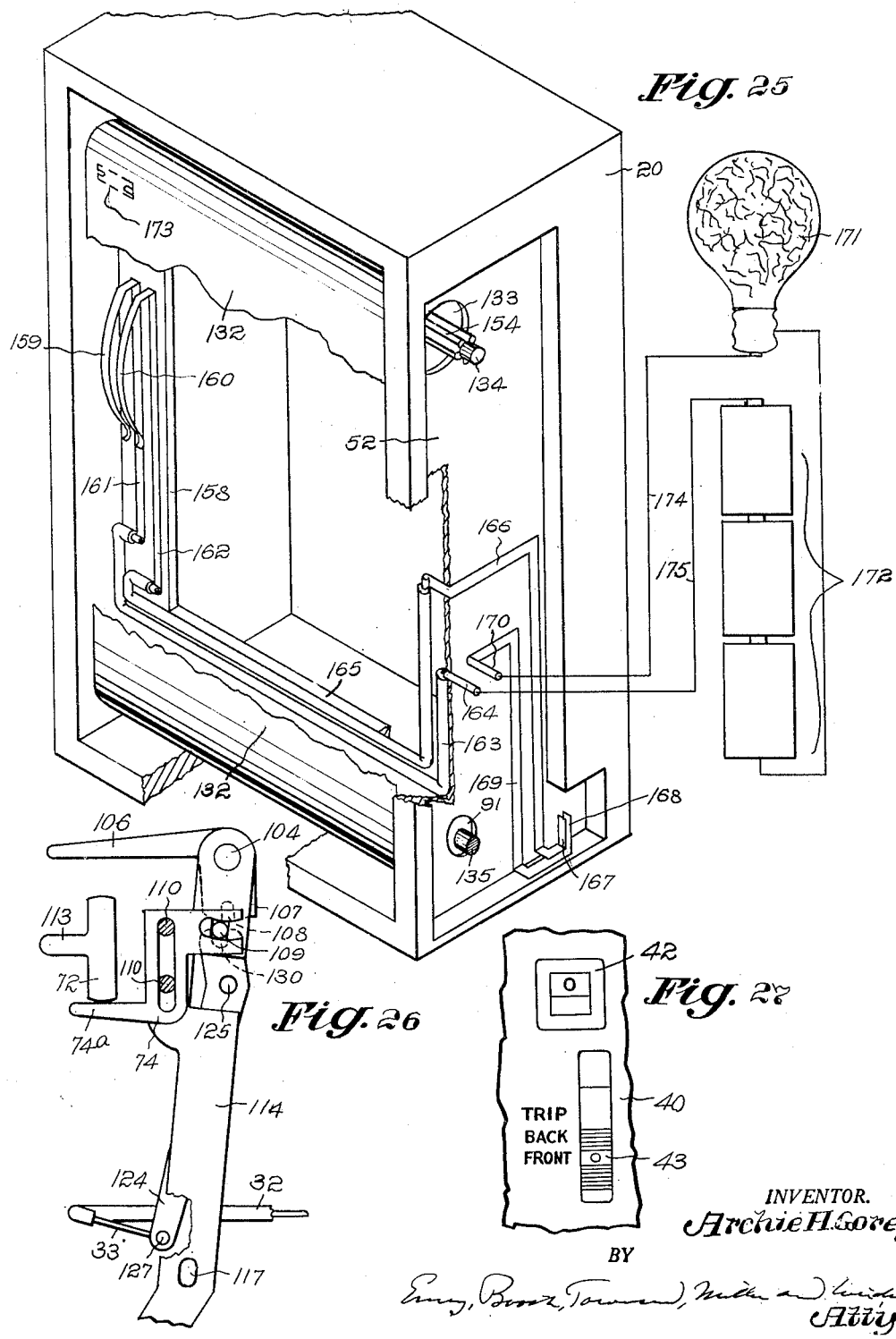

Patented Feb. 13, 1951

2,541,413

UNITED STATES PATENT OFFICE 2,541,413

PHOTOGRAPHIC CAMERA AND SHUTTER THEREFOR

Archie H. Gorey, Rochester, N. Y., assignor to Graflex, Inc., Rochester, N. Y., a corporation of Delaware Application April 1, 1947, Serial No. 738,579

33 Claims. (Cl. 95—53)

This invention relates to photographic cameras and shutters therefor.

In order that the principle of the invention may be readily understood, I have disclosed a single embodiment thereof in the accompanying drawings, wherein—

Fig. 1 is a left-hand side elevation of the camera to which my invention has been applied in this embodiment thereof;

Fig. 2 is a detail, partly in cross section, illustrating the structure of the front shutter release member;

Fig. 3 is a view similar to Fig. 1, but with the camera in a closed condition, the outer shutter plate having been removed, the intermediate shutter plate being shown broken away more clearly to show the shutter winding mechanism, and the shutter being set for a speed of 1/500 of a second;

Fig. 4 is a view similar to Fig. 1, but wherein the camera is in closed condition and the shutter is set for 1/1000 of a second;

Fig. 5 is a side elevation of the camera box, but with the outer shutter plate removed and the shutter release or operating mechanism being shown in dotted lines;

Fig. 6 is a detail in cross section taken on the line 6—6 of Fig. 9, showing the construction of the shutter winding knob and the curtain rewind gear;

Fig. 7 is a detail in cross section taken on the line 7—7 of Fig. 8;

Fig. 8 is a back or underneath side view of the shutter intermediate plate, showing the construction and position of the mechanism carried thereon;

Fig. 9 is a side elevation of the shutter intermediate plate;

Fig. 10 is a right-hand end view of the construction shown in Fig. 9;

Fig. 11 is a back or underneath plan view of the shutter release mechanism;

Fig. 12 is a vertical section of the construction shown in Fig. 11, taken on the line 12—12 thereof;

Fig. 13 is a detail in plan of the shutter curtain having one end foreshortened;

Fig. 14 is a vertical section of the construction shown in Fig. 11, taken on the line 14—14 thereof, showing the mounting of the several shutter release members;

Fig. 15 is a vertical section of the construction shown in Fig. 8, taken on the line 15—15 thereof, showing the shutter rewind mechanism;

Fig. 16 is a schematic view showing the relationship of the shutter release plate and the shutter release mechanism when set for focal plane operation, the shutter being shown in the released condition;

Fig. 17 is a schematic view showing the shutter as having been released by the shutter trip member, for the selection of a different aperture;

Fig. 18 is a schematic view of the shutter release plate when in the normal condition;

Fig. 19 is a detail showing the relationship between the shutter release member and the synchronizer contacts;

Fig. 20 is a detail in longitudinal section showing the construction of the curtain tension roller and the mounting of the retard drive gear;

Fig. 21 is a detail in elevation showing the construction of the shutter curtain shaft locking mechanism;

Fig. 22 is an isometric schematic view of the curtain shutter and the release mechanism, the shutter selector having been set for the focal plane shutter and ready for an operation of the curtain shutter by means of the shutter release lever;

Fig. 23 is a vertical section through the retard mechanism, taken on the line 23—23 of Fig. 24;

Fig. 24 is a schematic view of the shutter retard mechanism, the shutter indicating gear, and the means for selecting the proper indication of shutter speeds;

Fig. 25 is an isometric view of the camera box showing the shutter curtain in place and broken away and having the several mechanism plates removed to show the wiring for the synchronizer mechanism:

Fig. 26 is a schematic view of the shutter operating mechanism wherein the shutter release means has been set for operating the front shutter, the shutter release lever having been operated to cause the operation of the front shutter; and Fig. 27 is a fragmentary detail of a part of the construction shown in Fig. 1, showing the shutter selector in position for operating the front shutter and indicating that the focal plane shutter has been set at "0" to indicate an open aperture.

This invention, which in practice has proved highly successful, relates to shutters of photographic cameras and particularly to shutter operating mechanism for a camera having a front shutter and a focal plane shutter with separate release members for said shutters, and a common shutter release member engageable with either of said shutter release members to cause the operation of either of said shutters. While the focal plane shutter herein disclosed has numerous novel features, they are not herein claimed, but are claimed in a divisional application, Ser. No. 168,028, filed June 14, 1950.

Referring first to Fig. 1, the camera box indicated at 20 is provided with a camera back 21, a bellows 22, a front standard 23, a front shutter 24, a lens 25, a bed 26, a shutter release lever 27 having a pin 28, and a shutter release assembly indicated generally at 29 and shown in detail in Fig. 2.

The assembly 29 is made up of the following parts: a tube 30 having an undercut portion 31 to provide means for clamping to the camera, a flexible cable 32 having an inner movable cable 33 terminating in a shaft 34 and a plunger 35 fitted into the upper end of the tube 30 and having an enlarged flange 36. The plunger 35 is threaded onto the shaft 34 and is adjusted thereon by means of a screw driver slot 37. The said shutter release assembly 29 is attached to the camera by means of a bracket 38 having a clamp screw 39.

Attached to the right-hand side of the camera box 20, shown in Fig. 1, are an outer shutter plate or shutter cover 40 having a shutter winding key or knob 41, an opening 42, through which the shutter speed is indicated, and a shutter selector member 43, the purpose of which is to select the shutter to be used—that is, either the focal plane shutter or the between-the-lens shutter. The shutter plate 40 is also equipped with a receptacle 44 to complete a circuit to the flash synchronizing apparatus, subsequently described. At the bottom edge of the shutter plate 40 is indicated a speed selector lever 45, the purpose of which is to select one of two groups of shutter speeds, and the operation of which lever will be subsequently explained.

Also fitted into the right-hand wall of the camera box 20 is a shutter finger release 46 that can be used to operate either the front between-the-lens shutter or the back focal plane shutter, depending on the position of the shutter selector member 43, previously referred to. The camera bed 26 is provided with a track 47, to which is fitted the camera front standard 23, which is adjustable on said track 47 and is clamped thereto by a clamping member 48. The track 47 is adjustable in a horizontal direction by means of a focusing knob 49.

Next referring to Figs. 3 and 4—in Fig. 4 the camera is shown in a folded condition wherein the camera bed becomes a door for the camera box 20. The outer shutter plate 40 is attached to the camera box 20 by means of screws 50, 50. In Fig. 3 the outer shutter plate 40 has been removed so as to show clearly an intermediate shutter plate 51 and an inner shutter plate 52, which latter is actually a part of the camera box 20. The intermediate shutter plate 51 is represented partially broken away to show a shutter rewind gear 53, a shutter rewind pinion 54, a shutter release plate 55 having a pin 55a, shown in dotted lines in Fig. 5 and in full lines in Fig. 8, a counterpinion 56 and a shutter rewind gear shaft 57.

In Fig. 5 is shown the camera box 20 with the camera back 21, the camera bed 26 and the outer shutter plate 40 removed, the shutter operating mechanism being shown in dotted lines and referred to more fully hereinafter.

Referring to Fig. 6, which is a section through the intermediate shutter plate 51 taken at the winding key or knob 41—to the inner shutter plate 51 is attached a boss 58 having a bushing 59, into which latter is fitted the rewind gear shaft 57 carrying the rewind gear 53, the shutter winding key 41 and the counterpinion 56. The said shutter rewind gear 53 and the pinion 56 are attached to the shaft 57 by a shrink fit or other suitable means. The shutter winding key is attached to the shaft 57 by means of a pin 60. Attached to the shutter rewind gear 53 are ratchet dogs 62, 62. Fitted into a suitable opening provided in the intermediate shutter plate 51 is a speed indicating or index gear 63 that is provided with a pivot (not shown) on the said plate 51, the said gear 63 being free to rotate thereon. The speed indicating or index gear 63 meshes with the pinion 56 of the shaft 57 and serves to show the position of the shutter curtain at all times. The said gear 63 is provided with suitable markings (Fig. 24) that can be observed through the window 42 of the shutter plate 40, previously referred to.

In Fig. 8 is shown the back side of the intermediate shutter plate 51 and the mounting of the shutter release plate 55 by means of the shoulder screws 64, 64. Said shutter release plate 55 is separated from the intermediate shutter plate 51 by spacers 64a, and it is caused to be moved in a downward direction, viewing Fig. 8, by a spring 65, one end of which is attached to a pin 66 of said shutter release plate 55, and the other end whereof is attached to a pin 67 of the intermediate shutter plate 51. Said shutter release plate 55 is provided with cam faces 68 and 69 that co-act with the dogs 62 of the shutter rewind gear 53 when the shutter is operated to make an exposure or when rewinding the shutter, as subsequently described. Also carried on the intermediate shutter plate 51 is the shutter selector member 43, previously referred to, the construction whereof is most clearly shown in Fig. 7. The intermediate shutter plate 51 is provided with an elongated opening 70, shown in Fig. 7, into which is fitted a bushing 71 free to be moved in a vertical direction and of such length as to cause sufficient separation between the shutter selector member 43 and a shutter selector plate 72, shown in plan elevation in Fig. 8 and in section in Fig. 7. Said plate 72 is provided with a finger 73 that co-acts with the shutter release plate 55 for releasing the shutter in order to select a different shutter aperture, and it also co-acts with a member 74 of the shutter release mechanism to select one of the two shutters to be operated by the finger release 46, Figs. 5 and 11. Said member 74 is provided with a finger 74a at its lower end. Also attached to the said shutter release plate 72 is a plate spring 75 that rides on the inner shutter plate 52 and causes the release plate 72 to be pushed in an outward direction. The intermediate shutter plate 51 is provided with a suitable opening for a ball 76, and in the shutter selector plate 72 are provided notches 77, 77 that are engaged by the ball 76 when said shutter selector plate 72 is in any one of its several positions. The said spring 75 provides a yielding tension or friction on said plate 72 so that it can be moved out of position as determined by the ball 76. The shutter selector member 43, the shutter selector plate 72, the spacer 71 and the spring 75 are all fastened together by means of a screw 78.

Again referring to Fig. 8, attached to said intermediate shutter plate 51 is a bracket member 79 that is fitted into a suitable groove 80 in the back side of said plate 51, as shown in Fig. 8, and is connected to a second plate 81, as shown in Fig. 5, by means of screws 82, 82 and nuts 83, 83. A suitable spacer, shown in dotted lines Fig. 5 and indicated at 84, is provided to assure sufficient separation of said plates 79 and 81, and permits the assembly consisting of the plates 79 and 81 and the spacer 84 to be moved in a vertical direction in a suitable opening 85, indicated in dotted lines, Fig. 5.

Mounted between said plates 79 and 81 is a governor member, generally indicated at 86, Fig. 10, having a pinion 87 and a shaft 88, and also an idler gear 89 that meshes with a retard gear 90 on the curtain tension roller 91, Fig. 8. The said idler gear 89 is provided with a shaft 89a that is fitted in suitable bearings in the plates 79 and 81. The mechanism just referred to, best shown in Figs. 8 and 9, is herein termed the curtain or shutter retard mechanism, and is controlled by a bell crank lever 92, Fig. 5, that is pivoted on the intermediate shutter plate 51 and provided with an arm 93, that co-acts with the plate 81 of the curtain retard mechanism, and an arm 45 (previously referred to) to move the assembly in a vertical direction. The curtain retard mechanism is caused to be moved in a downward direction by a coiled spring 94, one end of which is hooked to the side plate 79, and the other end of which is connected to a pin 95 attached to the plate 51. Connected to the plate 81 of the curtain or shutter retard mechanism is an arm 96, Fig. 9, by a rivet 97. The upper end of said arm 96 is provided with a pad, mask or lateral extension 98 having an opening 99. A suitable opening in the plate 51, indicated at 100, is provided for the said pad 98, allowing it to be displaced in a vertical direction.

In Fig. 11 is shown a shutter release mechanism plate 101 normally mounted in a recess provided in the camera box 20 and held thereto by screws 102, 102 passing through holes 102a, 102a, also indicated in Fig. 5, wherein the mechanism attached to the said plate 101 is shown in dotted lines (also shown in Fig. 11) wherein the back side of said plate 101 is represented and shows the location of said parts on the said plate. To the upper left-hand corner of said plate 101, as shown in Fig. 11, is attached a bell crank lever 103 by means of a shoulder rivet 104, Figs. 11 and 13. Said bell crank lever 103 is provided with a bushing 105 that properly positions the said bell crank lever 103 with respect to the plate 101. Said bell crank lever 103 is provided with a finger 106, Fig. 11, and a downwardly extending member 107 provided with a notch 108 that engages a pin 109, to be again referred to.

Also mounted on said plate 101 is the member 74, previously referred to as co-acting with the shutter selector plate 73, and held to said plate 101 by shoulder rivets 110, 110. The said member 74 co-acting with the shutter selector plate 72 is provided with a vertical slot 112 (Figs. 11 and 16) and an arcuate transversely extending slot 113 (also shown in dotted lines in Fig. 11 and in solid lines in Fig. 16). The slight curvature of the slot 113 prevents any binding of the pin 109 when the common shutter release lever 114 is moved upon its pivot 104. Also pivoted on the shoulder rivet 104 is a common shutter release lever 114 having a bushing 115, Fig. 14, and properly positioned with respect to the bell crank lever 103 by a washer 116 (Fig. 14). The pin 109 is carried by said lever 114. The lower end of said common shutter release lever 114 is provided with an elongated opening or slot 117 that engages a pin 118 of the finger release member 46, which is held to the mechanism plate 101 by a pair of gibs 119, 119, which themselves are held to the mechanism plate 101 by rivets 120, 120, Fig. 11. Said opening or slot 117 permits lengthwise functioning movement of said common shutter release member 114. The extreme lower end of the common shutter release lever 114 is provided with a pin 121, to which a spring 122 is attached, the other end of said spring being attached to a pin 123 that itself is attached to the mechanism plate 101. Said spring 122 tends to cause the said release lever 114 to be rotated in a clockwise direction, viewing Fig. 11, and in a contraclockwise direction viewing Fig. 5. Any movement of said finger release member 46 is transmitted to the said release lever 114 by the pin 118, thus normally causing said finger release member 46 to be moved in an outward direction viewing Fig. 5.

To the mechanism plate 101, as best shown in Figs. 11 and 14, is pivoted a front shutter release lever 124 by means of a shoulder rivet 125. The said release lever 124 is provided with a bushing 126 to space said lever 124 with respect to the plate 101. The lower end of said release lever 124 is provided with a stud 127 having a hole 127a for receiving the front shutter release cable 33, Fig. 2, which is clamped to the stud 127 by a screw 128. The upper end of said release lever 124 is provided with a member 129 having a notch 130, Fig. 11.

Again referring to Figs. 11 and 14, the pin 109 passes through an elongated slot 131 (Fig. 14) of the common shutter release lever 114 and is held thereto by washers 131a, 131b. Said pin 109 also engages the arcuate slot 113 of the member 74 of the shutter release mechanism, previously referred to. It will be noted that any motion of said member 74 will be transmitted to said pin 109, and since said pin 109 can be moved in a vertical direction with respect to the common shutter release lever 114, said pin 109 can be caused to engage either the notch 108 of the member 107 or the notch 130 of the member 129 of the front shutter release lever 124, thus providing means for coupling either said release lever 124 or said bell crank lever 103 to the common shutter release lever 114. The said notches 108 and 130 are in the same vertical plane facing each other and are close together so that a slight movement of the pin 109 positions said pin in one of said notches or the other. Since any movement in a rotary direction of said common shutter release lever 114 will cause said pin 109 to move in a similar direction, either the bell crank lever 103 or the said front shutter release member 124 will be rotated, depending on the position of said pin 109 which in turn is controlled by the shutter selector member 43 through the shutter selector plate 72, the finger 74a, and the member 74 of the shutter release mechanism, which is caused to be moved in a vertical direction by the spring 103a hooked thereto. The other end of the spring 103a is hooked to the arm 106 of the bell crank lever 103 and causes it to turn in a clockwise direction.

Referring to Figs. 8, 16 to 18, 20, 22 and 25, the focal plane shutter is made up of a curtain 132 (Figs. 13 and 22), one end of which is partially wound on a take-up curtain roller 133 and the other end on the tension roller 91. The said roller 133 is mounted on a shaft 134, and the roller 91 is mounted on a shaft 135. The said shafts 134 and 135 are mounted in the camera box 20, suitable bearings being provided therefor (Fig. 25). The shaft 134 of the curtain roller 133 carries the pinion 54 that meshes with the shutter rewind gear 53. As the said shutter rewind gear 53 is turned in a contraclockwise direction by the shutter winding knob or key 41, the take-up curtain roller 133 is caused to turn in a clockwise direction, thus winding said focal plane curtain 132 on said roller 133 from the tension roller 91 which, as shown in Fig. 20, is mounted on the said shaft 135, and is provided with bushings 136 and 137. A coiled spring 138 is mounted inside said tension roller 91, one end of which spring is hooked to a bushing 137 that is itself securely attached to the tension roller 91. The other end of said spring 138 is attached to the shaft 135 which is provided with a flattened end 139 over which is fitted a locking plate 140. After the spring 138 has been sufficiently tensioned, a shoulder screw 141 is put in place, the shoulder whereof engages one of the semi-circular notches 142, thus holding said shaft 135 in position. This structure maintains a tension on the focal plane curtain 132 at all times.

The curtain 132 is provided with a number of openings or apertures 143, 144, 145 (Fig. 13). There may, within the scope of the invention, be as many apertures as desired depending on the number of different shutter speeds to be obtained. For each half revolution of the shutter rewind gear 53, a sufficient amount of curtain is wound on the take-up curtain 133 to place a curtain aperture in position to travel across the focal plane when the shutter is released. When the curtain 132 has been wound, one of the ratchet dogs 62 will be engaged by the cam face 68 of the shutter release plate 55 (Fig. 18). As said shutter release plate 55 is caused to move in an upward direction, the cam face 68 will be removed from the ratchet dog 62, allowing the shutter rewind gear 53 to rotate in a clockwise direction, viewing Fig. 18, until stopped by the cam face 69. This will allow of enough of the curtain 132 passing the focal plane to permit one of the curtain apertures to cross the focal plane, thus making an exposure.

Upon the release of the shutter release plate 55, it will again be returned to the position shown in Fig. 18, because of the spring 65 withdrawing or moving the said shutter release plate 55 in a downward direction. This will withdraw the cam face 69 from the ratchet dog 62, allowing the shutter rewind gear 53 to make a slight further rotation in a clockwise direction until stopped by the cam face 68. The curtain 132 will then be in position for a second exposure assuming that sufficient curtain length is wound on the curtain roller 133; if not, it will be necessary to rotate the shutter rewind gear 53 by means of the key or knob 41 in a contraclockwise direction, viewing Fig. 22, until sufficient curtain length for a second exposure is wound on the take-up curtain roller 133.

The part of the shutter mechanism per se just disclosed is not novel with me, and is not claimed per se herein, but it is necessary to described it and its action in order fully to disclose the invention that is herein claimed.

The shutter release plate 55 is provided with a flat spring finger 146 (Figs. 6 and 8), the purpose of which is to engage one of the rachet dogs 62 when the shutter is released so as to prevent it from bouncing and the shutter rewind gear 53 from oscillating. The present invention provides means for retarding or controlling the return of the velocity of the curtain 132 when it is released, thus providing means for securing two different shutter speeds for each aperture in the said curtain. When the curtain 132 is operated without the retarding means, a certain exposure time will be obtained from each curtain aperture, but when the curtain speed is controlled by an auxiliary means, a second series of exposure times will be obtained.

To provide such control, there is provided a governor or retarding mechanism, best shown in Fig. 23, wherein the shaft 88 is mounted in the plates 79 and 81 and carries an eccentric 147 and an eccentric 148. On the eccentric 147 is mounted a disk 149, and on the eccentric 148 is mounted a disk 150. Said disks 149 and 150 are prevented from rotating by means of arms 151 and 152 respectively. One end of the arm 151, best shown in Fig. 24, is connected to the disk 149 by a pin 153. One end of arm 152 is connected to the disk 150 by a pin 154. The other end of the arm 151 is connected to the plate 81 by a pin 155. The opposite end of the arm 152 is connected to the plate 79 by a pin 156. The shaft 88 also carries a pinion 87 that meshes with the idler gear 89, which can be caused to become meshed with the retard gear 90 carried as described by the curtain tension roller 91.

When the lever 45 at the bottom edge of the shutter plate 40 is in the position shown in Figs. 5 and 24, the idler gear 89 engages the retard gear 90 which in turn engages the pinion 87 on the shaft 88, causing said shaft to be rotated at a relatively high speed with respect to the curtain tension roller 91. This will vibrate the retarding disks 149 and 150 because of the eccentrics 147 and 148 respectively. Such retarding action will cut down the velocity of the curtain 132 to any predetermined amount depending on the weight and throw of said retarding disks 149 and 150.

In the disclosed embodiment of the invention, the mass has been so adjusted that it cuts the velocity of the curtain in two. If the curtain 132 is set for a normal $\frac{1}{1000}$ of a second exposure without the use of retarding means, an exposure of $\frac{1}{500}$ of a second will be obtained when the retarding means is engaged.

To provide an automatic indication of the shutter speed obtained, I have provided the speed indicating or index gear 63 which, as stated, is driven by the pinion 56 carried on the shaft 57 of the shutter rewind gear 53. The ratio of the pinion 56 with respect to the speed indicating or index gear 63 is such that said gear 63 will make one revolution when the curtain 132 has been wound through its entire length, and the said gear 63 carries data indicating what exposure will be obtained in the several positions of said gear 63, as, for instance, $\frac{1}{1000}$, $\frac{1}{500}$, $\frac{1}{250}$, $\frac{1}{50}$, $\frac{1}{25}$ of a second, etc. Also indication is provided when the curtain 132 is set for a time exposure and the open condition is also indicated.

Since it is possible to get two different shutter speeds for each curtain aperture, two markings are provided, close together, on the said gear 63 for each curtain setting, as, for instance, $\frac{1}{1000}$ and $\frac{1}{500}$. The speed of $\frac{1}{1000}$ of a second will be obtained without the use of retarding means and the speed of $\frac{1}{500}$ of a second will be obtained with the use of retarding means. Therefore, by connecting the retarding mechanism to the pad or mask 98, shown in Figs. 3, 5, 9 and 24, which has an opening provided therein, it is possible to give a direct indication of the exposure to be obtained. For example, viewing Fig. 24, if the speed selector lever 45 is moved in a contraclockwise direction, thus engaging the retarding mechanisms, as previous described, the pad or mask 98 will be in a position to uncover the figure 500, meaning 1/500 of a second, and, if said speed selector lever 45 is rotated in a clockwise direction, the position of said pad or mask 98 will be changed and the opening will uncover the numeral 1000, thus indicating an exposure speed of 1/1000 of a second. The same action is true for any one of the other speeds obtained by the several curtain apertures of the curtain 132.

This provides a direct and positive means for reading the exposure to be obtained when the curtain is released, which heretofore has never been accomplished, so far as I am aware, in the general type of shutter herein disclosed.

Referring to Fig. 25, the camera box 20 is provided with a partition 158 to which are attached contact members 159 and 160 having bus bars 161 and 162 respectively. To the bus bar 161 is connected a conductor 163 that terminates in a contact 164 of the receptacle 44 mounted on the outer shutter plate or shutter cover 40 (Fig. 1). To the bus bar 162 is connected a conductor 165 that is connected to a second bus bar 166 having formed at its lower end a contact member 167. A second contact member 168 is provided that connects to a bus bar 169 having its upper end terminating in a terminal 170 of the receptacle 44. The terminals 164 and 170 provide means for connecting a flashlamp 171 and its associated battery 172 for synchronizing said flashlamp with a focal plane curtain or shutter. The focal plane curtain 132, as shown in Figs. 13 and 22, is provided with a series of metallic tabs 173 located with respect to the curtain apertures so as to cause a flashing of the flashlamp 171 when a circuit is completed between contacts 159 and 160 by the contact 173. After the curtain 132 travels a sufficient distance for contact 173 to bridge the contacts 159 and 160, a circuit will thereby be completed through the conductors 163 and 165, the wires 174 and 175, and the battery 172, thus flashing the flashlamp 171. However, this circuit will only be completed if the contacts 167 and 168 are in the closed condition.

The general structure of the synchronizing mechanism herein shown is not a part of this invention, but is disclosed in the patent to Oscar Steiner, No. 2,188,065, dated January 23, 1940. The present invention constitutes an improvement upon the disclosure in said Steiner patent, in that I provide means to prevent inadvertent flashing of the lamp 171 when the shutter is being rewound or another aperture is being selected. This is accomplished herein in the following manner, reference being particularly made to Fig. 16.

The contacts 167 and 168 are normally in open condition. Therefore the movement of the focal plane curtain 132 and the traversing of a contact 173 over the contacts 159 and 160 will not complete a circuit to the flashlamp 171, but when the common shutter release lever 114 is operated by the finger release member 46 to cause an exposure, the contacts 167 and 168 will be closed by an insulated block 176, as most clearly shown in Fig. 16. Therefore, when the focal plane curtain shutter is released for making an exposure by the finger release 46, a circuit will be completed through the contacts 167 and 168 and at no other time.

I have now fully described the disclosed embodiment of my invention and will next give a resume of the operation of the camera using alternatively the front shutter and the focal plane shutter, and to that end I will first describe the operation of the between-the-lens shutter 24, Fig. 1.

Since a speed of 1/500 of a second is indicated in aperture 42, the camera user knows it will be necessary to have the back curtain open, which will be indicated by the numeral "0" in aperture 42 (Fig. 27), so that the curtain 132 will not obstruct the light passing through the lens 25 to the sensitized material at the focal plane. To accomplish this, the shutter selector member 43, Figs. 1, 17 and 22, is raised, and at the same time the finger 73 will thereby be raised, thus contacting with the lower part of the shutter release plate 55, causing it to be raised and thus disengaging the cam face 68 from one of the ratchet dogs 62 carried by the shutter rewind gear 53, which will, thereupon, make approximately one-half revolution in a clockwise direction viewing Fig. 18 until the ratchet pin 62 is stopped by the cam face 69, and the mechanism will accordingly be in the position shown in Fig. 17.

Upon the release of the shutter selector member 43, the finger 73 will be returned to its normal position, as will also the shutter plate 55, thus removing the cam face 69 from the ratchet dog 62, allowing the shutter rewind gear 53 to make a slight further rotative movement in a clockwise direction until the second ratchet dog 62 is stopped by the cam face 68. A speed of 1/250 of a second will now be indicated at the aperture 42. Therefore, the operation will be repeated until zero appears in the aperture 42. The curtain 132 is now in proper position for use of the front shutter 24. The shutter selector member 43 is then moved in a downward direction until the word "Front" aligns with the center of the shutter selector member 43 (Fig. 27). As the said shutter selector member 43 is moved in a downward direction, the plate 72 will also be moved in a downward direction, as shown in Fig. 16, contacting with the finger 74a of the shutter selector plate 74, thus shifting the pin 109 (Figs. 11 and 26) so as to be engaged by the notch 130 of the upwardly extending member 129 of the front shutter release lever 124 and withdrawing the pin 109 from the notch 108 of the downwardly extending member 107 of the bell crank lever 103. This will disengage the connection provided through the pin 109, between the common shutter release lever 114 and the focal plane shutter operating bell crank lever 103, connecting the front shutter release lever 124 with the common shutter release lever 114 through the pin 109 engaging slot 130, as previously described (Fig. 26).

As pressure is applied to the shutter finger release 46, the common shutter release lever 114 will be rotated in a clockwise direction about the pivot 104, carrying with it the pin 109 and causing the said front shutter release lever 124 to be turned in a contraclockwise direction, about the pivot 125. This will cause the cable 33 to be pulled through the cable housing 32 because of its connection to the said front shutter release lever 124 by means of the stud 127 (Fig. 26). As the cable 33 is pulled through the housing 32, the plunger 35 (Figs. 1 and 2) will be moved in a downward direction and its flange 36 will engage the pin 28 of the front shutter release lever 27, thus operating the front shutter 24. As long as the shutter selector member 43 remains in the position indicated in Fig. 27, the operation of the shutter finger release 46 will always operate the plunger 35, thus operating the front or between-the-lens shutter 24, and the focal plane curtain shutter 132 will not be operated and will remain in its open condition.

I will next describe the operation of the back or focal plane curtain shutter 132, first describing the high range of speeds. The front shutter 24, Fig. 1, is set on time and the said front shutter is released so that it is in its open condition. On some front shutters, the leaves thereof can be opened for the operation of the focal plane shutter by means of the so-called press focus lever.

The camera user will next select the shutter speed intended to be used, either by winding the shutter knob or key 41 if a higher speed is wanted, as indicated in the window 42 of the plate 40, or by lowering the shutter curtain 132 by moving upward the shutter selector member 43 and then releasing it in the manner described in connection with the front shutter operation. After the curtain 132 is positioned to provide the speed chosen (for the purpose of illustration, there is selected the speed of $1/1000$ of a second, as shown in Fig. 4), the shutter selector member 43 is then moved to the position shown in Fig. 1. The parts of the shutter operating mechanism will then be in the position shown in Fig. 22. The pin 109 will be in position to engage the notch 108 of the downwardly extending member 107 of the bell crank lever 103. Any motion of the common shutter release lever 114 through pressure on the shutter finger release 46 will cause the said common shutter release lever 114 to be rotated in a clockwise direction, thus causing the bell crank 103 to be also rotated in a clockwise direction, and the finger 106 of the bell crank lever 103 will contact with the pin 55a that is attached to the shutter release plate 55, thereby moving the shutter release plate 55 upward, as shown in Fig. 16. This will allow the focal plane curtain 132 to run down because the cam face has been withdrawn from the ratchet dog 62, allowing the shutter rewind gear 53 to make substantially one-half revolution in a clockwise direction and allowing the shutter rewind pinion 54 and the take-up curtain roller 133 to rotate in a contraclockwise direction. When pressure is removed from the shutter finger release 46, the shutter release mechanism will be restored to the condition shown in Fig. 18, wherein the cam face 69 will be disengaged from the ratchet dog 62, allowing the shutter rewind gear 53 to make a slight movement of rotation in a clockwise direction until the second ratchet dog 62 is engaged by the cam face 68. At this time, a shutter speed will be indicated of $1/250$ of a second, and if the focal plane shutter curtain 132 is not rewound, that length of exposure will be made upon a second pressure of the shutter finger release 46. If a second exposure of $1/1000$ of a second is desired, it will be necessary to rewind the focal plane curtain 132 through the curtain winding knob or key 41 so that the numeral 1000 will be shown in the aperture 42.

I have just described the manner of obtaining the high shutter speed series. I will now describe the manner of obtaining the low shutter speed series, and for the purpose it will be assumed that the camera is in the same condition as just described, wherein the numeral 1000 is in the aperture 42 in the shutter plate 40, and the camera user wants to make an exposure of $1/500$ of a second. It will be necessary only to rotate the speed selector lever 45 to the position shown in Figs. 1 and 24, in which position it will engage the shutter retarding mechanism, including the governor member 86, previously fully described, and will at the same time uncover the numeral 500 to be viewed in the aperture 42.

As the focal plane curtain shutter 132 is released through pressure on the shutter finger-release 46, the curtain 132 will be taken up on the curtain tension roller 91, but the speed of said curtain tension roller 91 will be governed by the governor member or retarding mechanism 86, and the pinion 87 of the shaft 88 that will be meshing with the idler gear 89, which in turn will be meshing with the retard gear 90 on the curtain tension roller 91, causing the eccentrics 147 and 148 to be revolved, thus vibrating the disks 149 and 150, and since it will require a definite amount of power to vibrate these disks, the curtain tension roller 91 will be slowed up.

The throw of the disks 149 and 150 and the weight of these parts have been so calculated and designed as, in this instance, to provide a retarding effect to the curtain tension roller 91 that will decrease the velocity of the focal plane curtain 132 and the curtain tension roller 91 to one-half its value obtained without the use of the retarding or governor mechanism. Therefore, if the curtain aperture selected is normally providing an exposure speed of $1/1000$ of a second, the same aperture would, with the use of the shutter retarding or governor mechanism, provide a speed of $1/500$ of a second. Any of the other speeds can be selected and used in like manner.

When it is desired to synchronize a flashlamp with the focal plane curtain shutter 132, it is necessary only to attach a standard battery case carrying a flashlamp and having suitable leads to the receptacle 44, and when the shutter is released, contact will be made in the manner already described, thus completing a circuit to the flashlamp 171, causing it to flash at the proper time to provide synchronization. It is to be understood, however, that the synchronization will be correct only when used in connection with shutter speeds wherein the retarding or governor mechanism is not used.

To provide an absolutely foolproof operation, I add a second switch in series with the flashlamp 171 that is operated by the speed selector lever 45 to open that switch whenever said lever 45 is in the position shown in Fig. 1 or in that position wherein the retarding or governor mechanism is used.

It will be evident from the foregoing description that there is herein disclosed a new camera structure provided with both a between-the-lens shutter and a focal plane curtain shutter, either of which can be operated selectively from a single shutter release button or member. There are also herein provided improvements in focal plane shutters whereby I can accurately control the speed of the focal plane shutter curtain to obtain two different shutter speeds for each aperture provided in the said curtain.

Having thus described one illustrative embodiment of the invention, it is to be understood that although specific terms are employed, they are used in a generic and descriptive sense and not for purposes of limitation, the scope of the invention being set forth in the following claims.

I claim:

1. Shutter operating mechanism for a photographic camera having a front shutter and a focal plane curtain shutter comprising a release member for the front shutter, a release member for the focal plane shutter, a common shutter release member engageable with either of said shutter release members to cause the operation of either shutter, manually operated means for causing the engagement of said common shutter release member with either of said shutter release members, and a shutter finger release operatively connected to said common shutter release member, so that movement of said shutter finger release operates whichever of the two shutters is operatively connected through said common shutter release member.

2. Shutter operating mechanism for a photographic camera having a front shutter and a focal plane curtain shutter comprising a release lever for the front shutter, a release lever for the focal plane shutter, a common shutter release lever engageable with either of said shutter release levers to cause the operation of either shutter, manually operated means for causing the engagement of said common shutter release lever with either of said shutter release levers, and a shutter finger release operatively connected to said common shutter release lever, so that movement of said shutter finger release operates whichever of the two shutters is operatively connected through said common shutter release lever.

3. Shutter operating mechanism for a photographic camera in accordance with claim 2, but wherein the said manually operable means is a shutter selector member manually movable to two different positions, and is operatively connected to the parts of the shutter operating mechanism, thereby to control by its manually imposed position which one of the two shutters will be operated by the shutter finger release.

4. Shutter operating mechanism for a photographic camera having a front shutter and a focal plane curtain shutter comprising a release member for the front shutter, a release member for the focal plane shutter, a common shutter release member engageable with either of said shutter release members to cause the operation of either shutter, manually operated means for causing the engagement of said common shutter release member with either of said shutter release members, and movable means operatively related to said common shutter release member for operating by its movement whichever of the two shutters is operatively connected through said common shutter release member.

5. Shutter operating mechanism for a photographic camera having a front shutter and a focal plane curtain shutter comprising a release member for the front shutter, a release member for the focal plane shutter, a common shutter release member engageable with either of said shutter release members to cause the operation of either shutter, manually operated shutter selector member for causing the engagement of said shutter release member with either of said shutter release members, and movable means operatively related to the said common shutter release member for operating by its movement whichever of the two shutters is operatively connected through said common shutter release member.

6. Shutter operating mechanism for a photographic camera having a front shutter and a focal plane curtain shutter comprising a release member for the front shutter, a release member for the focal plane shutter, a common shutter release member engageable with either of said shutter release members to cause the operation of either shutter, manually operated means for causing the engagement of said common shutter release member with either of said shutter release members, and movable means operatively related to said common shutter release member for operating by its movement whichever of the two shutters is then operatively connected for actuation through said common shutter release member.

7. Shutter operating mechanism for a photographic camera having a front shutter and a focal plane curtain shutter comprising a release member for the front shutter, a release member for the focal plane shutter, a common shutter release member engageable with either of said shutter release members to cause the operation of either shutter, manually operated means for causing the engagement of said common shutter release member with either of said shutter release members, whereby either of said shutters will be operated depending upon which one is engaged with the said common shutter release member.

8. Shutter operating mechanism for photographic cameras including a front shutter and a focal plane shutter, shutter release mechanism including a release member for the front shutter, a release member for the focal plane shutter and a common shutter release member engageable with either of said shutter release members, to cause the operation of either shutter, and a movably mounted shutter selector member positioned to cause, by movement thereof, the engagement of said common shutter release member with either of said shutter release members.

9. Shutter operating mechanism for a photographic camera in accordance with claim 1, but wherein there is provided on the camera body, a fixed shutter release mechanism plate wherein is mounted for movement the said release member for the focal plane shutter and also a movable member for the shutter operating or releasing mechanism, said movable member being provided with a vertical slot to receive a projecting, supporting and guiding rivet from said mechanism plate, and thereby permitting vertical movement of the said movable member, said movable member being also provided with a transverse slot, and wherein the said common shutter release member is provided with a projecting, pin-like formation to engage said transversely extending slot and movable therealong in the shutter operating action.

10. Shutter operating mechanism for a photographic camera in accordance with claim 1, but wherein the common shutter release member for the two shutters comprises a lever, and wherein spring means is provided to turn said lever in one direction of rotation.

11. Shutter operating mechanism for a photographic camera in accordance with claim 1, but wherein the common shutter release member for the two shutters comprises a lever, and wherein the shutter finger release is cooperatively related to the said lever so as to move the said lever.

12. Shutter operating mechanism for a photographic camera in accordance with claim 1, but wherein the front shutter release member comprises a lever having at its upper end having an upwardly directed notch, and wherein the said common shutter release member is provided with a laterally extending pin that may be moved by movement of said manually operated means into said notch for effecting the operation of the front shutter, said common shutter release member being a lever having a lower end provided with a slot and said finger release member having a pin to engage said slot, whereby movement of said finger release member is transmitted to the said common shutter release member.

13. Shutter operating mechanism for a photographic camera in accordance with claim 1, but wherein the front shutter release member comprises a release lever provided with a member having a notch therein, and wherein the common shutter release member is provided with means to engage the said notch, for operatively connecting the front shutter with the common shutter release member.

14. Shutter operating mechanism for a photographic camera in accordance with claim 1, but wherein the common shutter release member is provided with a slot, and wherein the focal plane shutter release member is provided with a notch, and wherein the front shutter release member is provided with a notch, and wherein there is provided a pin engageable alternatively either with said notch of the focal plane shutter release member or with the notch of the front shutter release member and wherein said pin is carried by said common shutter release member.

15. Shutter operating mechanism for a photographic camera in accordance with claim 1, but wherein the common shutter release member is provided with a slot permitting functioning movement with said member, and wherein the focal plane shutter release member is provided with a notch, and wherein the front shutter release member is provided with a notch, and wherein there is provided a pin engageable alternatively either with said notch of the focal plane shutter release member or with the notch of the front shutter release member, and means including said common shutter release member to move said pin into engagement with either of said notches, thereby controlling by such engagement either the front shutter release member or the focal plane shutter release member.

16. Shutter operating mechanism for a photographic camera in accordance with claim 1, but wherein the common shutter release member is provided with a slot permitting functioning movement with said member, and wherein the focal plane shutter release member is provided with a notch, and wherein the front shutter release member is provided with a notch, and wherein there is provided a pin engageable alternatively either with said notch of the focal plane shutter release member or with the notch of the front shutter release member, and means to move said pin into engagement with either of said notches, thereby controlling by such engagement either the front shutter release member or the focal plane shutter release member, said means for operating the pin including a lever constituting said common shutter release member.

17. Shutter operating mechanism for a photographic camera in accordance with claim 1, but wherein the common shutter release member is provided with a slot permitting functioning movement with said member, and wherein the focal plane shutter release member is provided with a notch, and wherein the front shutter release member is provided with a notch, and wherein there is provided a pin engageable alternatively either with said notch of the focal plane shutter release member or with the notch of the front shutter release member, and means to move said pin into engagement with either of said notches, thereby controlling by such engagement either the front shutter release member or the focal plane shutter release member, said means for operating the pin including a lever constituting said common shutter release member, and wherein there is provided a shutter finger release positioned to move the said lever constituting said common shutter release member.

18. Shutter operating mechanism for a photographic camera in accordance with claim 1, but wherein the front shutter release member comprises a lever, and the focal plane shutter release member comprises a bell crank lever, and wherein the common shutter release member comprises a lever, and wherein the said three levers have formations permitting the cooperative alternative engagement of said common shutter release lever with either of said other two levers in order thereby to render operative the shutter whose release lever is so engaged by said common shutter release lever.

19. Shutter operating mechanism in accordance with claim 8, wherein the camera body is provided with a fixed shutter plate 51 having a shutter selector member mounted for sliding movement thereon and having fast thereto for movement therewith a shutter selector plate 72, so that said selector plate 72, when moved by said shutter selector member, engages and moves a portion of the said shutter release mechanism, thereby to select one of the said two shutters to be operated.

20. Shutter operating mechanism in accordance with claim 8, wherein the camera body is provided with a fixed shutter plate 51 having the said movably mounted shutter selector member mounted for sliding movement thereon and having fast thereto for movement therewith a shutter selector plate 72, and the said shutter release mechanism including also a plate 74 mounted for sliding movement upon the camera body, the said shutter selector plate 72, when moved by movement of said movably mounted shutter selector member, engaging and moving said plate 74, thereby to select one of the said two shutters to be operated, the said plate 74, when so moved for shutter selection, connecting for operation through the said common shutter release member with either the said release member for the said front shutter or with the said release member for the said focal plane shutter.

21. Shutter operating mechanism for a photographic camera having a front shutter and a focal plane curtain shutter comprising, in combination, a shutter selector member, a shutter selector plate positioned to be moved thereby, a release lever for the front shutter, a release lever for the focal plane shutter, and a common shutter release lever for operatively engaging alternatively either of said release levers so as to cause by functioning movement of said common shutter release lever, the operation of the shutter whose release lever is in operative engagement with said common shutter release lever.

22. Shutter operating mechanism for photographic cameras in accordance with claim 21, wherein, in order to operate the focal plane shutter, the release lever therefor is provided at a downwardly directed portion thereof with a downwardly facing notch, and wherein the common shutter release lever is provided with a laterally extending pin adapted, upon movement of said common shutter release lever, to be brought into engagement with said notch, for effecting the operating of the focal plane shutter.

23. Shutter operating mechanism in accordance with claim 21, wherein for effecting the functioning engagement of the common shutter release lever with the front shutter release lever there is provided a pin on said common shutter release lever, and wherein the shutter selector plate is provided with a finger to shift the said pin so as cooperatively to engage with the front shutter release lever.

24. Shutter operating mechanism for a photographic camera in accordance with claim 21, but wherein for effecting the functioning engagement of the common shutter release lever with the focal plane shutter release lever, there is provided a pin carried by said common shutter release lever, and said focal plane shutter release lever is provided with a formation to be engaged by said pin.

25. Shutter operating mechanism for a photographic camera in accordance with claim 21, but wherein there is provided a shutter finger release to which pressure may be applied to operate either of said shutters depending upon the position of the common shutter release lever.

26. Shutter operating mechanism for photographic cameras comprising a front shutter, a focal plane shutter, a common shutter release member, a release member for said focal plane shutter, a release member for said front shutter, an operating pin-like projection carried by said common shutter release member, each of said two release members for said two shutters having a notch engageable by said pin-like projection upon proper movement of said common shutter release member, the said two notches being in alignment, facing each other and close together, said common shutter release member being movable in two directions to bring the said pin-like projection into engagement with one or the other of said notches respectively, thus providing means to couple either the release member for the front shutter or the release member for the focal plane shutter to said common shutter release member, whereby that shutter is rendered operable whose release member has its notch then engaged by said pin-like projection.

27. Shutter operating mechanism for a photographic camera in accordance with claim 2, but wherein for controlling the movement of the focal plane shutter, when the common shutter release lever has been engaged with the release lever for said focal plane shutter, by means of the said manually operated means so as to select for operation the said focal plane shutter, there is provided a shutter release plate for the focal plane shutter and a manually movable plate having a finger adapted to engage the shutter release plate to release the said focal plane shutter upon movement of said plates following the said movement of the said manually operated means for selecting said focal plane shutter for operation, the said manually operated means and the said manually movable plate being fastened together for movement together.

28. Shutter operating mechanism for a photographic camera in accordance with claim 2, but wherein for controlling the movement of the focal plane shutter, when the said common shutter release lever has been engaged with the release lever for such shutter by movement of said manually operated means to select such shutter, there is provided a shutter release plate, a manually movable plate to engage and move said shutter release plate, and a spring to provide friction with respect to the movement of said manually movable plate, said manually operated means and said manually movable plate being fastened together for movement together.

29. Shutter operating mechanism for a photographic camera in accordance with claim 2, but wherein for controlling the movement of the focal plane shutter, when the said common shutter release lever has been engaged with the release lever for such shutter by movement of the said manually operated means to select such shutter, there is a shutter release plate, a manually movable plate to engage and move said shutter release plate, and means to hold the said manually movable plate in either of a plurality of positions into which it may be moved, said manually operated means and said manually movable plate being fastened together for movement together.

30. Shutter operating mechanism for a photographic camera in accordance with claim 2, but wherein for controlling the movement of the focal plane shutter, when said common shutter release lever has been engaged with the release lever for such shutter by movement of the said manually operated means to select such shutter, there is a shutter release plate, a manually movable plate to engage and move said shutter release plate, and means to hold the said manually movable plate in either of a plurality of positions into which it may be moved, said holding means including notches in said plate and a cooperating ball engageable in any of said notches, said manually operated means and said manually movable plate being fastened together for movement together.

31. Shutter operating mechanism for photographic cameras including a front shutter and a focal plane shutter, shutter release mechanism including a release member for the front shutter, a release member for the focal plane shutter and a common shutter release member engageable with either of said shutter release members, to cause the operation of either shutter, and a movably mounted shutter selector member positioned to cause, by movement thereof, the engagement of said common shutter release member with either of said shutter release members, and a shutter finger release positioned and interacting to operate either the front shutter or the focal plane shutter, depending on the position to which the said shutter selector member has been moved.

32. Shutter operating mechanism for photographic cameras comprising a front shutter, a focal plane shutter, a common shutter release member, a release member for said focal plane shutter, a release member for said front shutter, an operating pin so supported as to be moved by movement of said common shutter release member, said two release members for said two shutters each having a notch alternatively engageable by said pin when moved thereinto, thus providing means to couple either the release member for the front shutter or the release member for the focal plane shutter to said common shutter release member, when moved thereinto, and means to move said operating pin selectively into either of said notches.

33. Shutter operating mechanism in accordance with claim 32, but wherein there is provided a shutter box having upon an outer wall thereof a manually operable shutter selector member for controlling the position of said pin, the said selector member being movable manually along the said shutter box wall, for the selection of either said front shutter or said focal plane shutter, a shutter selector plate fast with said selector member, the shutter release mechanism composed of the release member for the focal plane shutter and the release member for the front shutter and the common shutter release member, coacting with said selector member and said shutter selector plate, so as by movement of said selector member and said selector plate to select one of the said two shutters to be operated, and a cooperatively related finger release member to operate the selected one of said shutters, in accordance with the position of the said shutter selector member.

ARCHIE H. GOREY.

REFERENCES CITED

The following references are of record in the file of this patent:

UNITED STATES PATENTS

| Number | Name | Date |
|---|---|---|
| 885,236 | Folmer | Apr. 21, 1908 |
| 1,485,603 | Folmer | Mar. 4, 1924 |
| 1,707,849 | Fairchild | Apr. 2, 1929 |
| 2,165,403 | Mihalyi | July 11, 1939 |
| 2,188,065 | Steiner | Jan. 23, 1940 |
| 2,282,291 | Whitman | May 5, 1942 |
| 2,284,486 | Hineline | May 26, 1942 |
| 2,354,145 | Runcie | July 18, 1944 |
| 2,406,691 | Jacobson et al. | Aug. 27, 1946 |
| 2,408,864 | Longbottom | Oct. 8, 1946 |
| 2,424,439 | Doyle et al. | July 22, 1947 |